United States Patent
Zhang et al.

(10) Patent No.: US 11,828,266 B2
(45) Date of Patent: Nov. 28, 2023

(54) METHOD FOR DETERMINING AN EFFICIENCY AND/OR FOR CALIBRATING A TORQUE OF A DRIVETRAIN, IN PARTICULAR OF A WIND TURBINE

(71) Applicant: Fraunhofer-Gesellschaft zur Förderung der angewandten Forschung e.V., Munich (DE)

(72) Inventors: Hongkun Zhang, Bremerhaven (DE); Norbert Eich, Bremerhaven (DE); Martin Pilas, Bremerhaven (DE); Jan Wenske, Bremerhaven (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 663 days.

(21) Appl. No.: 15/733,585

(22) PCT Filed: Mar. 1, 2019

(86) PCT No.: PCT/EP2019/055130
§ 371 (c)(1),
(2) Date: Nov. 19, 2020

(87) PCT Pub. No.: WO2019/170539
PCT Pub. Date: Sep. 12, 2019

(65) Prior Publication Data
US 2021/0156361 A1      May 27, 2021

(30) Foreign Application Priority Data
Mar. 8, 2018   (DE) ..................... 10 2018 203 525.3

(51) Int. Cl.
*F03D 17/00*     (2016.01)
*F03D 15/00*     (2016.01)
(Continued)

(52) U.S. Cl.
CPC .............. *F03D 17/00* (2016.05); *F03D 15/00* (2016.05); *G01L 3/242* (2013.01); *G01L 3/26* (2013.01);
(Continued)

(58) Field of Classification Search
CPC ......... F03D 17/00; F03D 15/00; G01L 3/242; G01L 3/26; G01L 5/0095; G01L 25/003;
(Continued)

(56) References Cited

U.S. PATENT DOCUMENTS

| 1,662,705 A | 3/1928 | Highfield |
| 4,345,481 A * | 8/1982 | Schroyer ................. G01L 3/242 |
| | | 73/862.324 |

(Continued)

FOREIGN PATENT DOCUMENTS

| CN | 102829907 | 12/2012 |
| CN | 206876320 U | 1/2018 |

(Continued)

OTHER PUBLICATIONS

"Chinese Application Serial No. 201980029643.X, Office Action dated Nov. 15, 2021", w English Translation, (dated Nov. 15, 2021), 7 pgs.

(Continued)

*Primary Examiner* — Kenneth J Hansen
(74) *Attorney, Agent, or Firm* — Schwegman Lundberg & Woessner, P.A.

(57) ABSTRACT

A method for determining an efficiency and/or calibrating a torque of a drivetrain comprises two tests. The drivetrain has a motor-side end at a main shaft connectable to a motor and a generator-side end, with a generator arranged between the ends. In a first test, the motor-side end of the drivetrain is driven. A variable dependent on the main shaft torque is determined at the motor-side end of the drivetrain and an (Continued)

Figure 1:
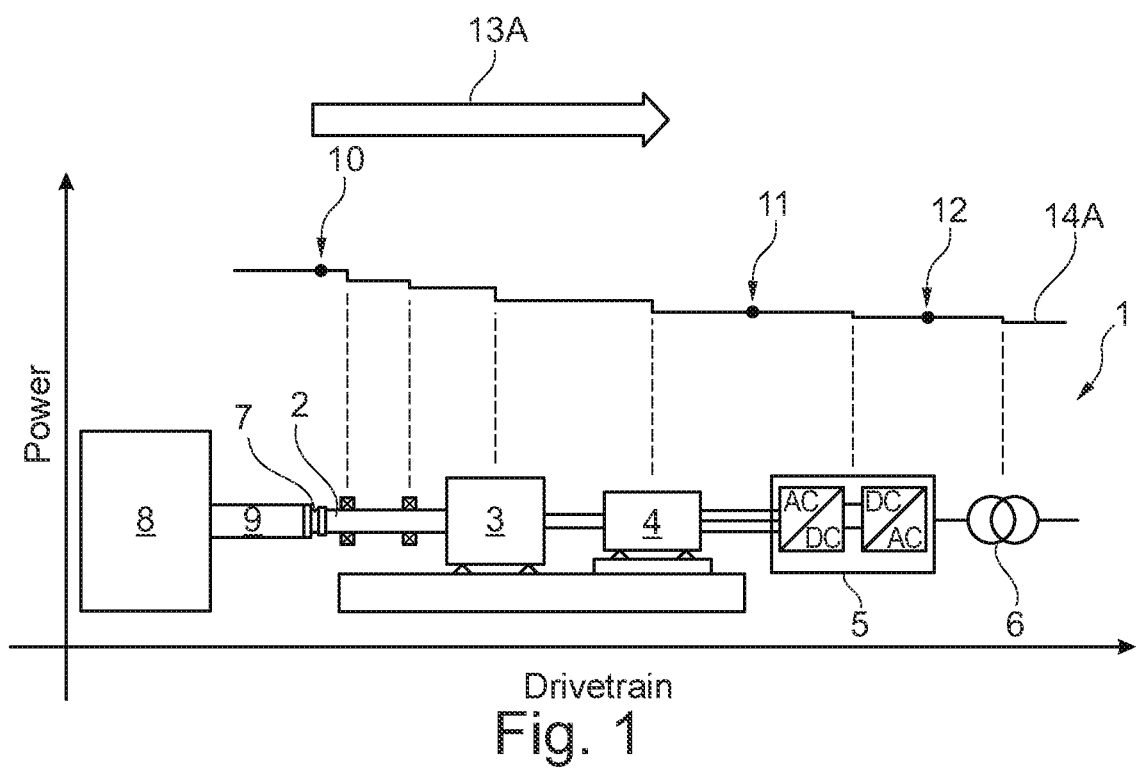

electrical power Pelec is determined at the generator-side end of the drivetrain. In a second test, the generator-side end of the drivetrain is driven and the variable dependent on the main shaft torque is determined at the motor-side end and the electrical power is determined at the generator-side end. An efficiency and/or calibration parameters is/are determined from the electrical power values and the variables dependent on the main shaft torque determined in the first test and second tests.

16 Claims, 3 Drawing Sheets

(51) Int. Cl.
*G01L 3/24* (2006.01)
*G01L 3/26* (2006.01)
*G01L 5/00* (2006.01)
*G01L 25/00* (2006.01)

(52) U.S. Cl.
CPC .......... *G01L 5/0095* (2013.01); *G01L 25/003* (2013.01); *G01L 25/006* (2013.01)

(58) Field of Classification Search
CPC ........ F05B 2260/821; F05B 2270/1032; F05B 2270/20; F05B 2270/335
USPC .......................................... 702/41; 73/862.28
See application file for complete search history.

(56) References Cited

U.S. PATENT DOCUMENTS

| | | | |
|---|---|---|---|
| 5,262,717 A | | 11/1993 | Bolegoh |
| 2019/0072072 A1* | | 3/2019 | Fang ...................... F03D 7/044 |

FOREIGN PATENT DOCUMENTS

| | | |
|---|---|---|
| CN | 206876339 | 1/2018 |
| DE | 19829178 A1 | 1/2000 |
| DE | 10326212 A1 | 3/2005 |
| DE | 102010047413 A1 | 6/2011 |
| DE | 102010049407 A1 | 3/2012 |

OTHER PUBLICATIONS

"International Application Serial No. PCT/EP2019/055130, International Search Report dated Apr. 14, 2019", (dated May 14, 2019), 5 pgs.

"International Application Serial No. PCT/EP2019/055130, Written Opinion dated Apr. 14, 2019", (dated May 14, 2019), 7 pgs.

Pagitsch, Michael, et al., "Feasibility of large-scale calorimetric efficiency measurement for wind turbine generator drivetrains", J. Phys. Conf. Ser. Vol. 753, (Sep. 1, 2016), Jul. 2011.

* cited by examiner

METHOD FOR DETERMINING AN EFFICIENCY AND/OR FOR CALIBRATING A TORQUE OF A DRIVETRAIN, IN PARTICULAR OF A WIND TURBINE

PRIORITY APPLICATIONS

This application is a U.S. National Stage Filing under 35 U.S.C. § 371 from International Application No. PCT/EP2019/055130, filed on Mar. 1, 2019, and published as WO2019/170539 on Sep. 12, 2019, which claims the benefit of priority to German Application No. 10 2018 203 525.3, filed on Mar. 8, 2018; the benefit of priority of each of which is hereby claimed herein, and which applications and publication are hereby incorporated herein by reference in their entireties.

The present application relates to a method for determining an efficiency and/or for calibrating a torque of a drivetrain, in particular of a drive train of a wind turbine, in particular on a test rig.

The efficiency and the torque of a drivetrain of a wind turbine is an important key figure for manufacturers and operators of wind turbines, both during development and also as an indicator of the technical maturity of a wind turbine. For this reason, there is a need for a sufficiently accurate efficiency measurement at different load situations and under different environmental conditions, in particular at high torques. A most accurate efficiency determination at high torques thus facilitates better knowledge of the wind turbine.

This knowledge of the efficiency characteristic curve is the basis for targeted refinement and optimized operation of a wind turbine.

The accuracy of the efficiency measurement according to the prior art is therefore dependent on the accuracy of a torque measurement at the drivetrain of the wind turbine, among other things. In modern wind turbines, a torque of the main shaft of the drivetrain is multiple meganewton meters. However, calibration devices of the prior art enable a calibration only up to a torque of 1.1 MNm. As there is currently no possibility for calibrating higher torques, a sufficiently accurate measurement of the mechanical torque at the main shaft of a wind turbine is not possible using the known methods.

The object of the present invention is thus to propose a method with which an efficiency of a wind turbine may be relatively accurately determined. Furthermore, one object of the invention may be to propose a method for calibrating a main shaft torque of a wind turbine.

These problems are solved by a method according to the features of claim 1 or of claim 2. Advantageous refinements arise with the features of the dependent claims and from the exemplary embodiment.

The method for determining an efficiency and/or for calibrating a torque of a drivetrain, in particular of a drivetrain of a wind turbine, is particularly suited for carrying out on a test rig and comprises two tests. The drivetrain has a motor-side end at a main shaft connectable to a motor and a generator-side end, between which ends a generator and optionally a transmission is/are arranged. The motor is preferably a motor of the test rig. The main shaft may be, in particular, a wind turbine main shaft, connectable to a rotor of a wind turbine.

In a first test, the motor-side end of the drivetrain is driven. A variable dependent on the main shaft torque is thereby determined at the motor-side end of the drivetrain and an electrical power $P_{elec}$ is determined at the generator-side end of the drivetrain.

In a second test, the generator-side end of the drivetrain is driven and the variable dependent on the main shaft torque is likewise determined at the motor-side end and the electrical power $P_{elec}$ is determined at the generator-side end. An efficiency is determined from the electrical power values and from the variables dependent on the main shaft torque determined in the first test and in the second test, in particular, using at least one assumption which was previously determined in prior experiments and analyses. One assumption is, for example, that the efficiency of the first test is equal to the efficiency of the second test. Another assumption may be made, that a power loss of the first test is a fraction of the total power loss, e.g., one half.

In the proposed method, a first torque is typically applied in the first test, and a second torque is applied in the second test. The drivetrain is driven by the test rig motor in the first test, while the drivetrain is driven by means of the generator in the second test, in that, for example, the generator is operated as a motor and the test rig motor is operated as a generator in the second test. Electrical torques of an electric machine have the same sign, that is, the same direction of rotation, regardless of whether they are operated as a motor or generator. Mechanical torques at the drivetrain likewise have the same sign, thus the same direction of rotation, regardless of which side of the drivetrain is driven. In contrast to the electrical torque, the mechanical torque typically has an opposite sign. As the drive is located at different ends of the drivetrain in the first and in the second test, namely at the motor-side end in the first test, the drivetrain may thus be driven, for example, by means of the test rig motor, and at the generator-side end in the second test, the drivetrain may thus be driven by means of the generator, a transmission direction is reversed between the first and the second tests. The rotating direction is thus reversed between the first and the second tests, i.e., the directions of rotation are different in the first and in the second tests. This may have the advantage that a measurement uncertainty of the variable dependent on the main shaft torque is reduced in the efficiency determination, as the measurement uncertainties of the first and the second tests may be subtracted.

As explained above, the drivetrain is driven by a motor of the test rig in the first test. The drivetrain is driven by the generator of the drivetrain in the second test, in that the generator is supplied with electricity and is operated as a motor. The motor of the test rig may be operated as a generator in the second test.

To determine a main shaft torque, the variable dependent on the main shaft torque may be measured by means of a sensor, preferably using a strain gauge. Furthermore, an angular position of the main shaft 6 and/or a rotational speed may be measured, in particular using an incremental encoder. A torque may thus be determined in an easy way. A measuring point for measuring the torque or the torque-dependent variable preferably lies as close as possible to a measuring point for measuring the angular position or the rotational speed. It may be achieved in such a way that the least possible fluctuations occur between the measuring points, which may corrupt the measurement results.

The mechanical power is calculated from the energy, at $$P_{mech,A} = E_{mech,A}/t_A$$

for the first test, and at $$P_{mech,B} = E_{mech,B}/t_B$$

for the second test, where $E_{mech}$ is the mechanical energy in each case and t is the time duration of the respective test. The first or the second test may also comprise a powering up or powering down of the system to be tested. However, for convenience, very constant power levels may be tested or assumed.

The electrical power is calculated from the energy, at $$P_{elec.A}=E_{elec.A}/t_{A\ A}/t_A$$

for the first test, and at $$P_{elec.B}=E_{elec.B}/t_B$$

for the second test, where $E_{elec}$ is the electrical energy in each case and t is the time duration of the respective test.

The mechanical energy may be determined using the variable dependent on the main shaft torque or the main shaft torque. The mechanical energy may be determined, for example, by integrating the torque either over the angle θ or over time using the rotational speed ω. The electrical power may be determined on the basis of measurements of the current and of the voltage.

Furthermore, a mechanical power may be determined from the variable dependent on the main shaft torque and/or from the angular position e or the rotational speed. The mechanical power is typically determined over the time duration of the first or the second test. A mechanical power is preferably determined from the variable dependent on the main shaft torque for the first and the second test. The mechanical power determined for the first test may thus be a driving power, while the mechanical power determined for the second test may be a driven power.

To determine the electrical power, a voltage and a current may be measured at the generator-side end between the generator and a converter connected with the same or at the side of the converter facing away from the generator. Thus, a loss of the converter may be included or ignored in the determination of efficiency. In the first test, the measured electrical power $P_{elec}$ may be a driven power and a driving power during the second test.

A test power loss may be respectively determined for the first test and for the second test. These two determined test power losses may be added to be a total power loss and the efficiency may subsequently be calculated using the total power loss.

The first test is subsequently characterized by the indicator A and the second test by the indicator B. The test power loss for the first test may result from $$P_{loss.A}=P_{mech.A}-P_{elec.A}$$

where $P_{mech.A}$ is the mechanical power in the first test, and $P_{elec.A}$ represents the electrical power in the first test.

The test power loss for the second test may result from $$P_{Loss.B}=P_{elec.B}-P_{mech.B},$$

where $P_{mech.B}$ is the mechanical power in the second test, and $P_{elec.B}$ represents the electrical power in the second test.

By adding the test power losses $P_{Loss.A}$ and $P_{Loss.B}$, a total power loss $P_{Loss.total}$ may be calculated:

$$P_{Loss.total}=P_{Loss.A}+P_{Loss.B}=P_{mech.A}-P_{mech.B}+P_{elec.B}-P_{elec.A}.$$

In particular, using the assumption that the efficiency of the first test and the efficiency of the second test are equal (Eff=Effi$_A$=Eff$_B$), $$\tilde{P}_{Loss.A} = \tilde{P}_{mech.A}(1 - Effi)$$

$$\tilde{P}_{Loss.B} = \tilde{P}_{elec.B}(1 - Effi)$$

$$\tilde{P}_{Loss.A} = \frac{\tilde{P}_{mech.A}}{\tilde{P}_{elec.B}} \tilde{P}_{Loss.B}$$

the test power losses results from as a function of the total power loss $$\tilde{P}_{Loss.A} = \frac{\tilde{P}_{mech.A}}{\tilde{P}_{mech.A} + \tilde{P}_{elec.B}} \tilde{P}_{Loss.total}$$

$$\tilde{P}_{Loss.B} = \frac{\tilde{P}_{elec.B}}{\tilde{P}_{mech.A} + \tilde{P}_{elec.B}} \tilde{P}_{Loss.total}$$

The efficiency Effi may thereby be calculated based on $$Effi = \frac{\tilde{P}_{elec.A}}{\tilde{P}_{mech.A}} = \frac{\tilde{P}_{elec.A}}{\tilde{P}_{elec.A} + \tilde{P}_{Loss.A}}$$

or $$Effi = \frac{\tilde{P}_{mech.B}}{\tilde{P}_{elec.B}} = \frac{\tilde{P}_{elec.B} - \tilde{P}_{Loss.B}}{\tilde{P}_{elec.B}}$$

where the tilde over the values indicates that these are average values.

A simpler assumption may also be made, e.g., that the losses of the two tests are the same. A more general assumption may thereby be:

$$P_{Loss.A}=k \cdot P_{Loss.total},$$

where k is a ratio of the loss of the first test (Loss.A) over the total loss (Loss.total). The assumption of the value k may be determined through experience or through an analysis, for example, k may be equal to 0.5.

The calculation of the efficiency as a function of the total power loss $P_{Loss.total}$ has the advantage that the efficiency may be determined as a function of a difference value $\Delta P_{mech}=P_{mech.A}-P_{mech.B}$ or $\Delta P_{elec}=P_{elec.B}-P_{elec.A}$. As was already mentioned above, a difference value of this type has the advantage that a measurement uncertainty of the torque measurement or of the variable dependent on the torque, or a measurement uncertainty of the electrical power may be limited by these difference values to a smaller range. By overlapping these tests, the measuring errors may be subtracted from one another and become less crucial during a determination of the efficiency. Thus, the efficiency may be more accurately determined without having to carry out an exact torque measurement.

To determine the variable dependent on the main shaft torque, the measurement signal of a sensor may be evaluated, which may be arranged at an output shaft of the test rig motor, at the main shaft of the wind turbine, or at a shaft adapter between the output shaft of the test rig motor and the main shaft of the wind turbine. For example, strain gauges may be applied at the output shaft of the test rig motor for this purpose. Alternatively, strain gauges may also be provided at the adapter, which is necessary in order to connect a drivetrain of the test rig motor to the drivetrain of the test object. Alternatively, the main shaft of the test object may also be equipped with strain gauges. Naturally, different and/or additional sensors for determining the variable dependent on the main shaft torque are also conceivable, e.g., an additional rotary encoder for measuring a torsion of the shaft between the two rotary encoders.

During the first test, different operating points of the wind turbine may be approached. During the second test, different operating points of the wind turbine may likewise be approached. The operating points approached in the first and in the second test may preferably be the same. Due to the approach of different operating points, an efficiency may be respectively determined according to the method described above for the different operating points approached. Typically, an efficiency differs as a function of the different operating points. To determine the efficiency, only one operating point needs to be approached; however, multiple different operating points are preferably approached. It may thereby be advantageous to cover the total power range so that the operating points may be distributed as broadly as possible over the power range. Examples for this would be approaching an operating point at 20% of the capacity, an operating point at 50% of the capacity, and an operating point at 100% of the capacity.

In the second test, the generator-side end of the drivetrain may be driven in such a way that the variable dependent on the main shaft torque in the second test is equal to the variable dependent on the main shaft torque determined in the first test. This may have the advantage that a measurement uncertainty of the variable dependent on the main shaft torque may be kept low. The electrical power may be determined for the first and the second tests. For this purpose, a current and a voltage may be measured, as described above. The generator of the wind turbine may be operated at different operating points (with different power levels). Furthermore, a total power loss may be determined from the variables measured in the first and in the second test $$P_{Loss.total} = P_{mech.A} - P_{mech.B} + P_{elec.B} - P_{elec.A}.$$

In the case that the correlation of the energy conversion efficiency to the two operating points is available, the measured total power loss may be distributed as corresponds to the two tests. Otherwise, if not enough information is available, the loss may be evenly distributed to the two tests corresponding to the input power. The percentage of the loss may be determined as a property of the operating point as the average value of the test loss of the two tests.

In another embodiment of the method, the generator-side end of the drivetrain may be driven in the second test in such a way that the electrical power in the second test is equal to the electrical power determined in the first test. This may have the advantage that the generator operates in the first and second test at the same operating point, so that the energy conversion efficiency may be measured at exactly this point, and there may be substantially no, or a very low uncertainty about which operating point the energy conversion efficiency is measured. Furthermore, a loss distribution may be determined for the two tests with a lower uncertainty. The total power loss thus results, as above, from $$P_{Loss.total} = P_{mech.A} - P_{mech.B} + P_{elec.B} - P_{elec.A}.$$

A measurement uncertainty of the mechanical power values may thereby correspondingly play a greater role when compared with the method described above, in which the electrical power values are kept the same in the first test and in the second test.

As in the method for determining an efficiency of the drivetrain, two tests, preferably on a test rig, may be carried out in the method for calibrating a torque measurement, in particular of a drivetrain of a wind turbine. As described with regard to the method for determining an efficiency of a drivetrain, the drivetrain has a motor-side end on a main shaft connectable to a motor and generator-side end, between which ends a generator is arranged. The motor is preferably a motor of the test rig. The main shaft may be, in particular, a wind turbine main shaft, connectable to a rotor of a wind turbine.

In the first test, the motor-side end of the drivetrain is driven and the variable dependent on the main shaft torque is determined at the motor-side end of the drivetrain and an electrical power $P_{elec}$ is determined at the generator-side end of the drivetrain. In the second test, the generator-side end of the drivetrain is driven and the variable dependent on the main shaft torque is likewise determined at the motor-side end of the drivetrain and the electrical power $P_{elec}$ is determined at the generator-side end. Calibration parameters a and b may be determined from the electrical power values and the variables dependent on the main shaft torque determined in the first test and in the second test, in particular when taking into account at least one assumption predetermined on the basis of experiments or experience. To determine the calibration parameters, the first and the second test are carried out for at least two torque settings.

The different torque settings may thereby define different power levels. The tests may thus be repeated for different power levels. Thus, a substantially constant torque is generally applied at one torque setting.

In general, it may be assumed, as mentioned above, that a ratio k exists between the losses of the first test and the second test $$k = P_{Loss.A}/P_{Loss.B}$$

where $P_{Loss.A} = P_{mech.A} - P_{elec.A}$, and $P_{Loss.B} = P_{elec.B} - P_{mech.B}$.

It follows that, $$P_{mech.A} - P_{elec.A} = k(P_{elec.B} - P_{mech.B})$$

and $$P_{mech.A} + kP_{mech.B} = kP_{elec.B} + P_{elec.A}$$

From the more specific assumption, described above, that the efficiency may be identical in the first and in the second test ($Effi = Effi_A = Effi_B$), $$P_{mech.A} = P_{elec.A}/Effi$$

and $$P_{mech.B} = P_{elec.B} \cdot Effi$$

and from this is deduced $$k_A P_{mech.A} + k_B P_{mech.B} = k_B P_{elec.A} + k_A P_{elec.B}$$

where $$k_A = Effi/(1+Effi), k_B = 1/(1+Effi).$$

The mechanical power may be calculated by an integration of the torque T over an angle $\Theta$ divided by the time t. The mechanical power values for the first and second tests may thus be calculated as follows:

$$\tilde{P}_{mech.A} = \frac{\tilde{E}_{mech.A}}{t_A} = \frac{\int_{\theta_0}^{\theta_A} T d\theta}{t_A}$$

$$\tilde{P}_{mech.B} = \frac{\tilde{E}_{mech.B}}{t_B} = \frac{\int_{\theta_0}^{\theta_B} T d\theta}{t_B}$$

where T is the torque and $t_A$ and $t_B$ are the time durations of the first or second tests. The time duration $t_A$ or $t_B$ may each describe a time duration, in which the first or the second test provides relatively stable values, thus values with low fluctuations.

The torque may be set in relation to the variable dependent on the torque. If the variable dependent on the torque is determined, for example, by a strain gauge, then the variable dependent on the torque may be a strain ε. The torque may then result from $$T=a\cdot\varepsilon+b.$$

a and b may thereby be parameters to be calibrated.

The mechanical power values for the first and second tests may then be written as follows:

$$\tilde{P}_{mech.A} = \frac{\int_{\theta_a}^{\theta_A}(a\varepsilon+b)d\theta}{t_A} = \text{Polynom1}A(a,b)$$

$$\tilde{P}_{mech.B} = \frac{\int_{\theta_b}^{\theta_B}(a\varepsilon+b)d\theta}{t_B} = \text{Polynom1}B(a,b)$$

using the angular change Θ,
or as $$\tilde{P}_{mech.A} = \frac{\int_0^{t_A}(a\varepsilon+b)\omega dt}{t_A}$$

$$\tilde{P}_{mech.B} = \frac{\int_0^{t_B}(a\varepsilon+b)\omega dt}{t_B}$$

using the angular speed ω,
and are inserted into the above equation under the assumption of the same efficiency $$k_A P_{mech.A}+k_B P_{mech.B}=k_B P_{elec.A}+k_A P_{elec.B}$$

or into the more general equation $$P_{mech.A}+k P_{mech.B}=k P_{elec.B}+P_{elecA}$$

in which the efficiencies of the first and second tests are not necessarily assumed to be equal.

As described above, a distribution value may be assumed for k, which describes which proportion the power loss $P_{Loss.A}$ of the first test has of the total power loss $P_{Loss.total}$ and which proportion the power loss $P_{Loss.B}$ of the second test has of the total power loss $P_{Loss.total}$:

$$P_{Loss.A}=k P_{Loss.total} \text{ or } P_{Loss.B}=k\cdot P_{Loss.total}.$$

The unknowns of this equation may then be the calibration parameters a, b, and optionally the efficiency. The efficiency for a respective power level may thereby be determined, for example, using the method described above, assumed to be one or assumed from experiences. For each power level, for which a first and a second test was respectively carried out, the cited more general equation may thus be established (with an efficiency for each power level), or the more specific equation (for the case that $\text{Effi}_A=\text{Effi}_B=\text{Effi}$) may be established.

Using at least two equations, the parameters a and b may be determined, so that the torque may be determined on the basis of the following ratio using the calibration parameters a and b and the measured value (here strain E):

$$T=a\cdot\varepsilon+b.$$

If the two tests have thereby been carried out for more than two power levels, then a system of equations may be established for different power levels (indicated by the indicators I, II, III, . . . ):

$$\text{Polynom1}_I(a,b,\text{Effi}_I)=P_I$$

$$\text{Polynom1}_{II}(a, b, \text{Effi}_{II})=P_{II}$$

$$\text{Polynom1}_{III}(a,b,\text{Effi}_{III})=P_{III}.$$

The system of equations may be solved using the method of the least squares, so that the torque may be calculated on the basis of the determined constants a, b.

The method for calibrating the torque may be optimized, in particular if no calibration has been carried out yet and only a "raw measurement signal", e.g., of the strain, is available. The efficiency is thereby not yet determined. Another starting point for an optimization of the method for calibrating the torque is that a calibrated torque signal already exists; however the accuracy is not yet sufficient. For this purpose, starting from an assumption that the efficiency is equal to one or an efficiency is a predetermined empirical value, the calibration parameters a and b may be determined from the correlation indicated above between the torque and "raw signal ε". Subsequently, the efficiencies for at least two power levels may be determined according to the previously described method for determining the efficiencies. As described above, two tests are thereby carried out for each power level and the torque or the variables dependent on the torque and the electrical power values are measured in the first and in the second test. Using the newly calculated efficiencies for all power levels, the calibration parameters or the correlation between measured signals and torques may be corrected or redetermined. This may be repeated any number of times until the determined calibration parameters only deviate slightly from the previously determined calibration parameters.

The respective torque may be determined, as described above, from the correlation between the calibration parameters, the measurement signal, and the torque.

An exemplary embodiment describing the method will subsequently be described and an exemplary test rig structure will be explained in greater detail on the basis of the figures.

Figure 2:
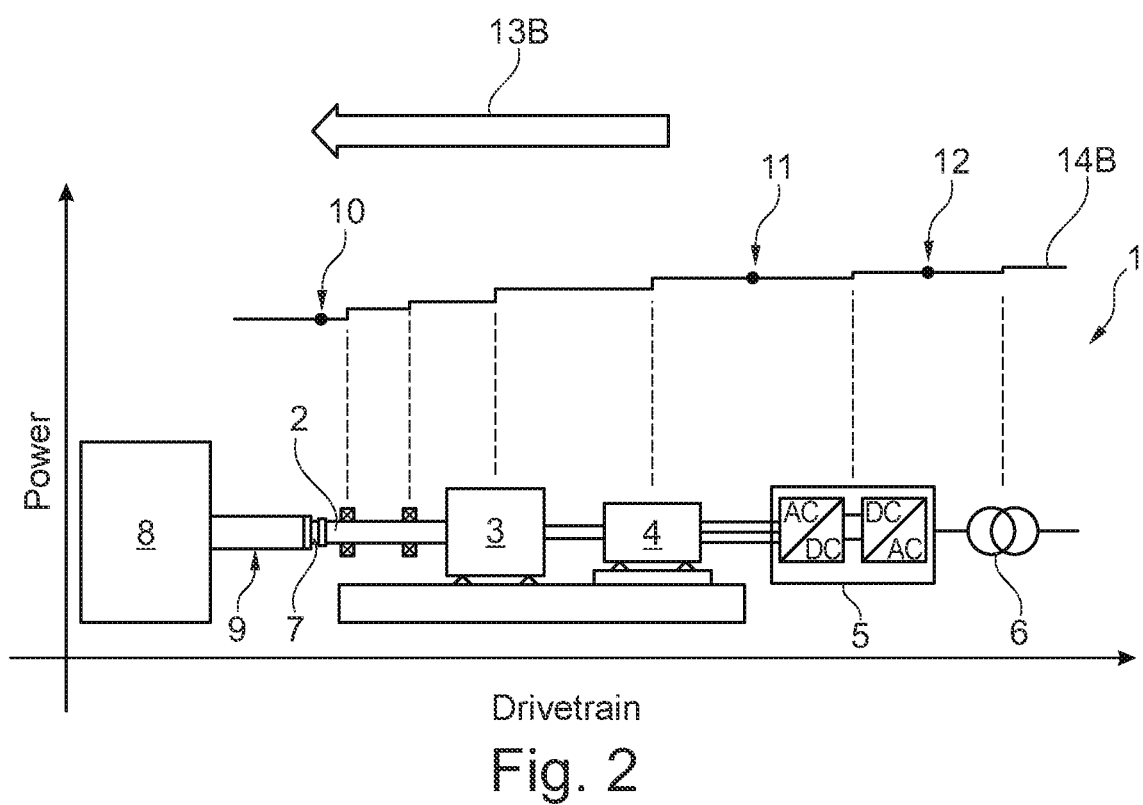
Figure 3:
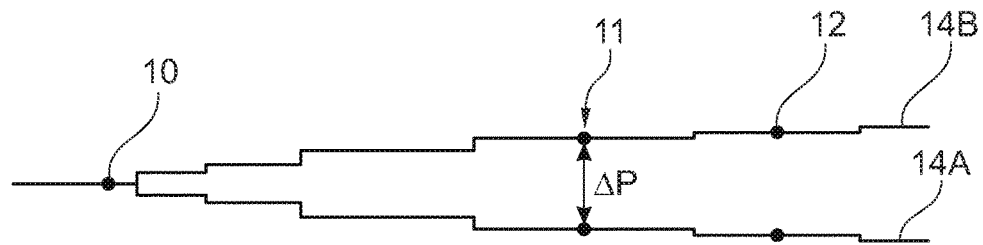
Figure 4:
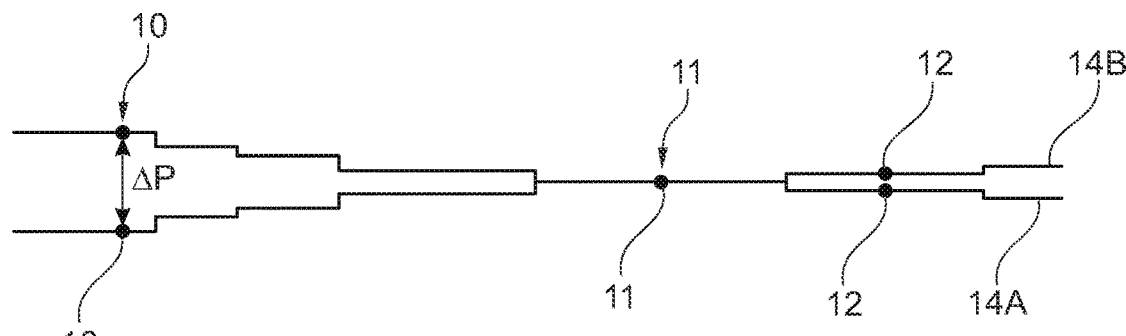
Figure 5:
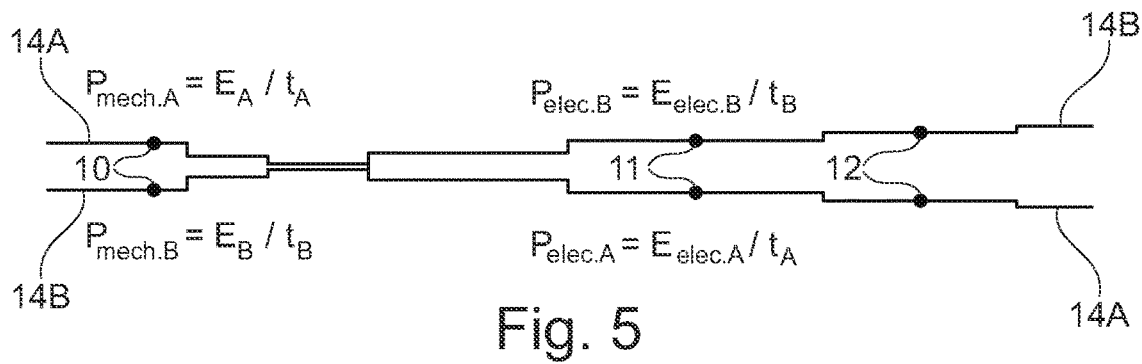
Figure 6:
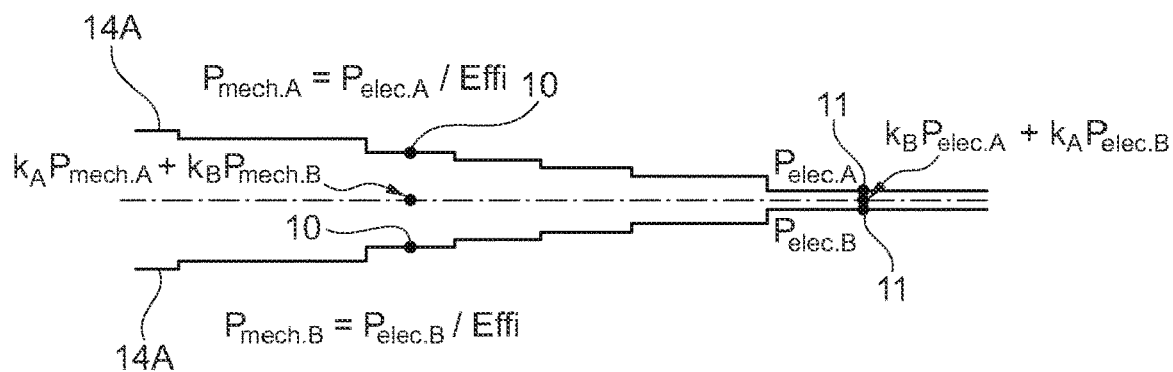
Figure 7:
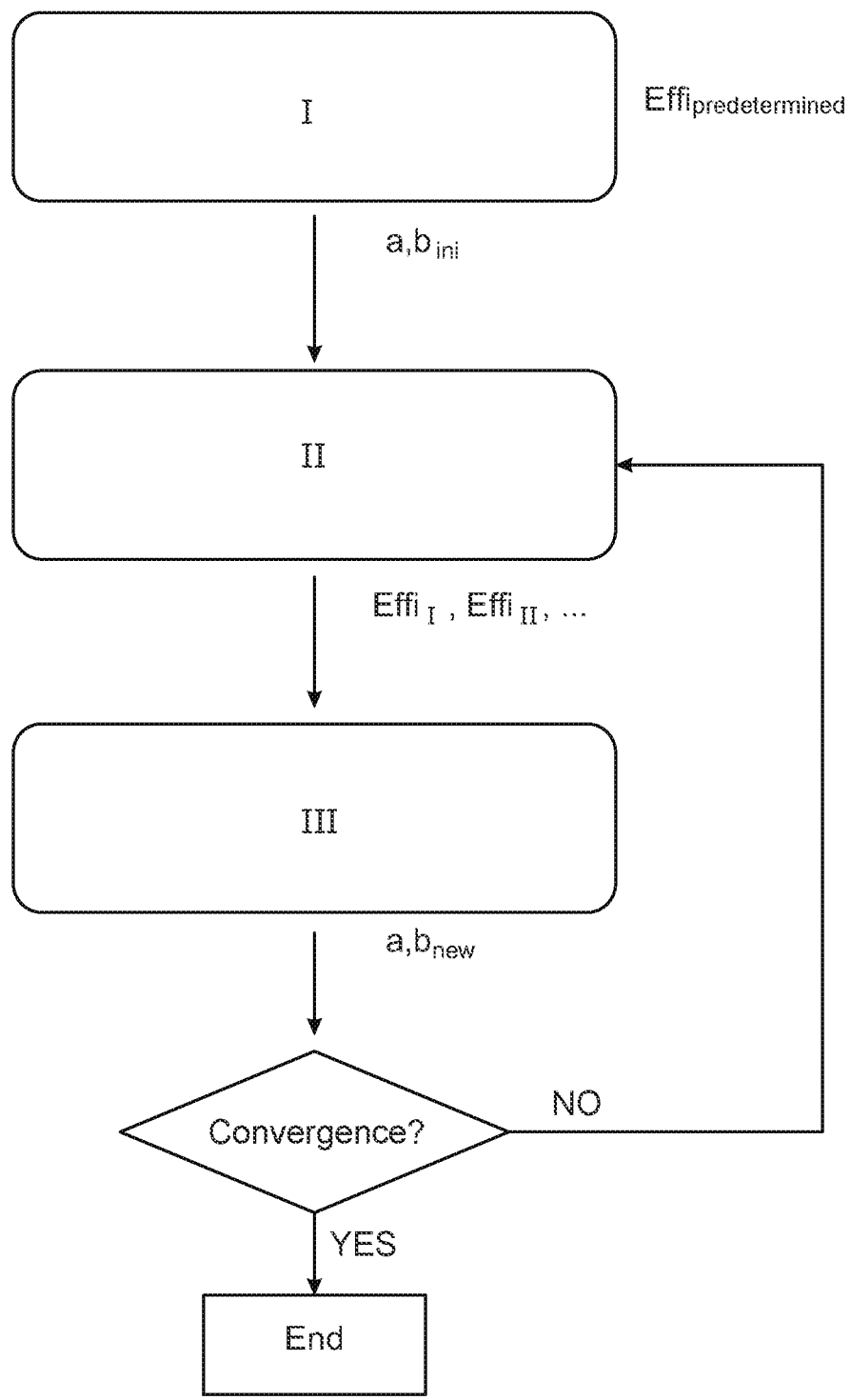

As shown in:

FIG. 1 a schematic drawing of a drivetrain of a wind turbine,

FIG. 2 the schematic drawing of the drivetrain from FIG. 1, wherein the power flow is reversed, FIG. 3 schematic staircase profiles, which illustrate the energy in the first or second test, wherein the mechanical energy is the same at a first measuring point, FIG. 4 schematic staircase profiles, which illustrate the energy in the first or second test, wherein the electrical energy is the same at a first measuring point, FIG. 5 staircase profiles from two tests, wherein the generator is driven in the second test in such a way that the energy is different at the respective measuring points for the first and second tests, FIG. 6 staircase profiles of two tests in terms of the average power, and FIG. 7 a flowchart for explaining the method for optimizing the torque calibration in greater detail.

FIG. 1 shows a schematic drawing of a drivetrain 1 of a wind turbine having a main shaft 2, which is connected to a generator 4 via a transmission 3. Furthermore, the main shaft is coupled to an output shaft 9 of a test rig motor 8 via an adapter 7. Generator 4 is additionally connected to a converter 5 which in turn is connected to a transformer 6. Three measuring points 10, 11, and 12 are indicated along drivetrain 1. At first measuring point 10, a variable dependent on the torque is measured by means of a sensor, for example, a strain is measured by means of a strain gauge. The sensor is arranged on the main shaft for this purpose in the example shown. The sensor may also be placed, for example, in another embodiment, at adapter 7 or at motor output shaft 9. Second measuring point 11 lies between generator 4 and converter 5. An electric current and an electric voltage of the generator may be measured here, so that an electrical power may be calculated therefrom. Alternatively to measuring point 11, a current and an electric voltage may also be measured at measuring point 12, which lies between converter 5 and transformer 6 or at a side of transformer 6 facing away from the converter, so that any losses of the converter flow into the calculated electrical power.

To determine an efficiency of drivetrain 1, a first test is carried out in which motor 8 drives main shaft 2. The direction of the power flow is indicated by arrow 13A. Gradual losses of the different components of the drivetrain are schematically depicted on the basis of staircase profile 14A. The power at measuring point 10 is thus greater than the power at measuring point 11, and this is greater than the measured power at measuring point 12.

FIG. 2 likewise shows the schematic drawing of drivetrain 1. In a second test, said drivetrain 1 is driven by generator 4 as a motor and the test rig runs in generator operation. The power flow is indicated by arrow 13B. Due to the drive being reversed with respect to the first test, the measured power at measuring point 12 is greater than the measured power at measuring point 11, and the measured power there is in turn greater than the power at measuring point 10, as is illustrated in staircase profile 14B.

Thus, two tests are basically carried out to determine the efficiency. The tests are each carried out in such a way that the drivetrain is driven either at the same output level or at least substantially at the same output level. Different measuring scenarios are additionally possible. In a first measuring scenario, the generator-side end is driven in the second test in such a way that the mechanical power values of the first and second tests are equal. In another measuring scenario, the electrical power values of the first and second tests are kept the same. These scenarios are shown in FIGS. 3 and 4. In another possibility, however, the drivetrain may also be driven in the second test without maintaining the mechanical or electrical power values as constant for tests one and two. This scenario is shown in FIG. 5.

FIG. 3 shows the staircase profiles of first and second tests 14A and 14B according to the first measuring scenario, wherein generator 4 is driven in the second test in such a way that the mechanical power at first measuring point 10 in the first test is equal to the mechanical power at first measuring point 10 in the second test. I.e., the measured value for the measured mechanical torque is kept constant and equal in the two tests. Thus, there arises at measuring point 11 a total power loss $\Delta P$ between the first and the second test, which is detected by measuring the current and the voltage in each case in the two tests.

FIG. 4 shows the staircase profiles of first and second tests 14A and 14B, wherein generator 4 is driven in the second test according to the second measuring scenario in such a way that the electrical power at second measuring point 11 in the first test is equal to the electrical power at second measuring point 11 in the second test, i.e., the electrical power is respectively measured in the two tests, wherein the electrical power in the second test is set to that of the first test. Thus, there arises at measuring point 10 a total power loss in mechanical power $\Delta P$ between the first and the second test.

Staircase profiles 14A and 14B from two tests are depicted in FIG. 5, wherein in the second test, generator 4 is driven in such a way that the energy is different at respective measuring points 10, 11, and 12 for the first and second tests. The electrical and mechanical power values depicted in the figure are the power values determined across the duration of the test, i.e., the energies divided by the time duration of the tests.

Using an incremental encoder, an angular position is measured for the first test and for the second test, from which a torque T or an energy and/or power $$\tilde{P}_{mech.A} = \frac{\tilde{E}_{mech.A}}{t_A} = \frac{\int_{\theta_0}^{\theta_A} T d\theta}{t_A}$$

$$\tilde{P}_{mech.B} = \frac{\tilde{E}_{mech.B}}{t_B} = \frac{\int_{\theta_0}^{\theta_B} T d\theta}{t_B}$$

may be determined. Furthermore, a current I and a voltage U are each measured for the first and the second tests. From these measured variables, a mechanical power may be calculated and an electrical power may be calculated for the first test $$P_{elec.A} = E_{elec.A}/t_A$$

for the first test, and at $$P_{elec.B} = E_{elec.B}/t_B$$

The tildes, which in the above equations indicate averaged values, are left out of the subsequent equations for the sake of simplicity.

The test power loss for the first test results from $$P_{Loss.A} = P_{mech.A} - P_{elec.A}$$

And the test power loss for the second test results from $$P_{Loss.B} = P_{elec.B} - P_{mec.hB}.$$

By adding the test power losses $P_{Loss.A}$ and $P_{Loss.B}$, a total power loss $P_{Loss.total}$ may be calculated:

$$P_{Loss.total} = P_{Loss.A} + P_{Loss.B} = P_{mech.A} - P_{mech.B} + P_{elec.B} - P_{elec.A}.$$

By using $$\tilde{P}_{Loss.A} = \frac{\tilde{P}_{mech.A}}{\tilde{P}_{mech.A} + \tilde{P}_{elec.B}} \tilde{P}_{Loss.total}$$

-continued $$\tilde{P}_{Loss.B} = \frac{\tilde{P}_{elec.B}}{\tilde{P}_{mech.A} + \tilde{P}_{elec.B}} \tilde{P}_{Loss.total}$$

a test power loss $P_{Loss.A}$ and $P_{Loss.B}$ may be determined for each test.

The determined values may then be inserted into $$Effi = \frac{\tilde{P}_{elec.A}}{\tilde{P}_{mech.A}} = \frac{\tilde{P}_{elec.A}}{\tilde{P}_{elec.A} + \tilde{P}_{Loss.A}}$$

or $$Effi = \frac{\tilde{P}_{mech.B}}{\tilde{P}_{elec.B}} = \frac{\tilde{P}_{elec.B} - \tilde{P}_{Loss.B}}{\tilde{P}_{elec.B}}$$

in order to obtain efficiency Effi. $P_{mech.A}$, $P_{mech.B}$, $P_{elec.B}$ and $P_{elec.A}$ are thereby measured, so that $P_{Loss.total}$ may be determined therefrom. A division of $P_{Loss.total}$ yields $P_{Loss.A}$ or $P_{Loss.B}$.

The efficiency may be calculated from $P_{Loss.A}$ and $P_{elec.A}$ or from $P_{Loss.B}$ and $P_{elec.B}$. Normally, an electrical measurement is thereby more accurate, so that preferably $P_{elec.A}$ or $P_{elec.B}$ may be used to calculate the efficiency.

FIG. 6 shows two staircase profiles 14A and 14B. The electrical power at measuring point 11 in the first test is set to be substantially equal to the power at measuring point 11 in the second test. The power of the first and second test for measuring point 10 may be described as $$P_{mech.total} = k_A P_{mech.A} + k_B P_{mech.B}$$

and may be described for measuring point 11 as $$P_{elec.total} = k_B P_{elec.A} + k_A P_{elec.B}$$

whereby $k_A = Effi/(1+Effi), k_B = 1/(1+Effi)$, and $Effi$ is the efficiency of the drivetrain.

FIG. 6 thereby shows staircase profiles 14A and 14B, which occur when the assumption is made that the efficiency of the first test is equal to the efficiency of the second test ($Effi_A = Effi_B = Effi$), so that the following equation applies:

$$k_A P_{mech.A} + k_B P_{mech.B} = k_B P_{elec.A} + k_A P_{elec.B}.$$

If the two tests are carried out such that the wind turbine operates at a similar operating point in the first and in the second test, then the power losses of the two tests should likewise be similar or have a certain correlation. The loss in each test may be assumed to be half or a part of the total loss with a certain degree of uncertainty. The uncertainty, which is introduced by the assumption of the losses in the two operating modes, may be analyzed using the behavior of the generator and other important mechanical and electrical components of the turbine.

FIG. 7 shows a flowchart for explaining the method for optimizing the torque calibration in greater detail. The basis for this method are the two tests, which were explained on the basis of the previous figures.

In step I, calibration factors a, $b_{ini}$ may initially be determined arising from a predetermined efficiency, which was, if necessary, determined from previous experiments and a measured value ε.

Subsequently in step II, the efficiencies ($Effi_I$, $Effi_{II}$, ... ) may be determined for at least two power levels using a variable dependent on the torque. Two tests are thereby carried out for each power level and the variables dependent on the torque and the electrical power values are measured in the first and in the second test.

In third step III, calibration parameters a, $b_{ini}$ may be recalculated using the determined efficiency, and this may be carried out for all power levels. If the recalculated calibration parameters a, $b_{neu}$ deviate strongly from the previously determined calibration parameters, then the efficiencies may be redetermined for the respective power levels and these results compared with the former values. This may be repeated any number of times until the determined calibration parameters only deviate slightly from those previously determined. Thus, a torque measurement may also be calibrated for large torques and carried out with great accuracy.

The described torque calibration may be used, as described above, for drivetrains of wind turbines, but also for other drivetrains of other electrical machines.

It is thereby important that both sides, thus the test rig motor and the generator motor, may run both in motor and in generator operation.

For improved accuracy of the calibration, the machine operated as a generator in the first test may be selected so that the power loss in both modes (thus in the first and in the second test), is as similar as possible.

A specific application may be that two electrical machines of the same type are used. The test rig is replaced by one of the machines in this case. The two machines run in so-called "back to back" mode, wherein a measuring body to be calibrated is installed on the drive train between the machines.

The invention claimed is:

1. A method for determining an efficiency of a drivetrain of a wind turbine, wherein the drivetrain has a motor-side end on a main shaft connectable to a motor and a generator-side end, between which ends a generator is arranged, the method comprising:
   performing a first test, wherein in the first test, the motor-side end of the drivetrain is driven and a variable dependent on a main shaft torque is determined at the motor-side end of the drivetrain and an electrical power $P_{elec}$ is determined at the generator-side end of the drivetrain;
   performing a second test, wherein in the second test, the generator-side end of the drivetrain is driven, and the variable dependent on the main shaft torque is likewise determined at the motor-side end and the electrical power $P_{elec}$ is determined at the generator-side end; and
   determining at least one of an efficiency or one or more calibration parameters from the electrical power values and the variables dependent on the main shaft torque determined in the first test and in the second test, using at least one predetermined assumption.

2. The method according to claim 1, wherein an assumption for determining the efficiency or for calibrating a torque measurement is the assumption that the efficiency of the first test is equal to the efficiency of the second test.

3. The method according to claim 1, wherein an assumption for determining the efficiency or for calibrating a torque measurement is the assumption that a power loss of one of the two tests is a fraction of a total power loss of the two tests.

4. The method according to claim 1, wherein to determine the torque of the main shaft, the variable dependent on the main shaft torque is measured using a sensor, and/or an angular position θ of the main shaft or a rotational speed ω of the main shaft is measured.

5. The method according to claim 1, wherein a mechanical power is determined from the variable dependent on the main shaft torque for the first and for the second test.

6. The method according to claim 1, wherein, to determine the electrical power, a voltage and a current are measured at the generator-side end between the generator and a converter connected to the same, or at the side of the converter facing away from the generator.

7. The method according to claim 1, wherein a test power loss is determined for the first test and for the second test respectively, wherein these two determined test power losses are added together for a total power loss, and wherein the efficiency is calculated using the total power loss.

8. The method according to claim 4, wherein, to determine the variable dependent on the main shaft torque, a measurement signal of the sensor is evaluated, which is arranged at an output shaft of the motor, or at a shaft adapter between the output shaft of the motor and the main shaft.

9. The method according to claim 1, wherein different operating points of the drivetrain are approached during the first test, and that different operating points of the drivetrain are approached during the second test.

10. The method according to claim 1, wherein the generator-side end of the drivetrain is driven in the second test in such a way that the variable dependent on the main shaft torque in the second test is equal to the variable dependent on the main shaft torque determined in the first test.

11. The method according to claim 1, wherein the generator-side end of the drivetrain is driven in such a way in the second test that the electrical power in the second test is equal to the electrical power determined in the first test.

12. The method according to claim 1, wherein, by using the variable dependent on the main shaft torque, a mechanical power $P_{mechA}$ and $P_{mechB}$ is determined as a function of two constants a and b for the first test and for the second test, respectively, $$\tilde{P}_{mech.A} = \frac{\int_{\theta_0}^{\theta_A}(a\varepsilon + b)d\theta}{t_A}$$

$$\tilde{P}_{mech.B} = \frac{\int_{\theta_0}^{\theta_B}(a\varepsilon + b)d\theta}{t_B}$$

and based on:

$$P_{mech.A} - P_{elec.A} = k(P_{elec.B} - P_{mech.B})$$

and $$P_{mech.A} + kP_{mech.B} = kP_{elec.B} + P_{elec.A}$$

where k is a correlation between losses of the first test and of the second test, wherein calibration parameters a and b for determining a torque are determined using:

$$T = a\varepsilon + b$$

where T is the torque and c is the measured variable dependent on the main shaft torque.

13. The method according to claim 1, wherein each value of the main shaft torque determined in the first test and the second test defines a different power level of the drivetrain.

14. The method according to claim 1, wherein starting from a predetermined efficiency, the one or more calibration parameters are determined, then efficiencies are determined for at least two power levels and subsequently the one or more calibration parameters are determined again, and the last two steps are repeated until the deviation between the last and the preceding determination is smaller than a predetermined value.

15. The method according to claim 1, wherein the one or more calibration parameters are determined using the method of least squares.

16. A method for calibrating a torque measurement of a drivetrain of a wind turbine, on a test rig, wherein the drivetrain has a motor-side end on a main shaft connectable to a motor and a generator-side end, between which ends a generator is arranged, the method comprising:
performing a first test, wherein in the first test, the motor-side end of the drivetrain is driven and a variable dependent on a main shaft torque is determined at the motor-side end of the drivetrain and an electrical power $P_{elec}$ is determined at the generator-side end of the drivetrain;
performing a second test, wherein in the second test, the generator-side end of the drivetrain is driven, and the variable dependent on the main shaft torque is likewise determined at the motor-side end and the electrical power $P_{elec}$ is determined at the generator-side end; and
determining calibration parameters a and b from the electrical power values $P_{elec}$ and the variables dependent on the main shaft torque determined in the first test and in the second test, using at least one predetermined assumption, wherein the first and the second test are carried out for at least two torque settings.

* * * * *